June 25, 1957 A. A. BROWN 2,797,384
MAGNETIC AMPLIFIER DEMODULATOR
Filed Sept. 30, 1954

INVENTOR.
ABBOTT A. BROWN
BY Herbert Smith
ATTORNEY

United States Patent Office 2,797,384

Patented June 25, 1957

2,797,384

MAGNETIC AMPLIFIER DEMODULATOR

Abbott A. Brown, Paramus, N. J., assignor to Bendix Aviation Corporation, Teterboro, N. J., a corporation of Delaware Application September 30, 1954, Serial No. 459,488

8 Claims. (Cl. 323—89)

This invention relates to a magnetic amplifier and more particularly to a magnetic amplifier demodulator.

The demoulator of the present invention is of extreme versatility in utilizing high speed magnetic amplifier elements and having high noise rejection properties with good stability. The device is economical of components and power, and requires very low driving power.

An important object of the invention is to provide a novel magnetic amplifier for converting carrier frequency voltages into proportional differential unidirectional voltage.

Another object of the invention is to provide a novel demodulator using magnetic amplifier elements for converting carrier frequency voltages, which are in phase or 180° out of phase with a fixed reference voltage, into proportional differential direct current voltages.

Another object of the invention is to provide a novel demodulator employing magnetic amplifier elements for rejecting undesirable electrical noise or voltages.

A further object of the invention is to provide a novel magnetic amplifier demodulator for converting carrier frequency voltages into proportional differential direct current voltages and which demodulator has a power gain.

Another object is to provide a novel magnetic amplifier requiring very low driving power.

A further object is the provision of a novel magnetic amplifier demodulator which has a minimum of components, is extremely stable and is unaffected by voltage, frequency, and temperature variations, and yet requires no warm-up time.

The present invention contemplates a magnetic amplifier demodulator employing a pair of saturable reactor elements each having reset and gate windings operatively connected to respective common mid-points. A modulated signal is fed into a center tapped coupling transformer having its secondary coupled through rectifiers to the reset windings. The gate windings are coupled through rectifiers to a three-terminal output. A power transformer supplies a reset voltage to the mid-taps of the coupling transformer and the reset windings, and also supplies a gating voltage to a common connection or mid-point of the gate windings and one of the three output terminals. The device converts the carrier frequency voltages into a proportional differential direct current voltage and provides gain.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
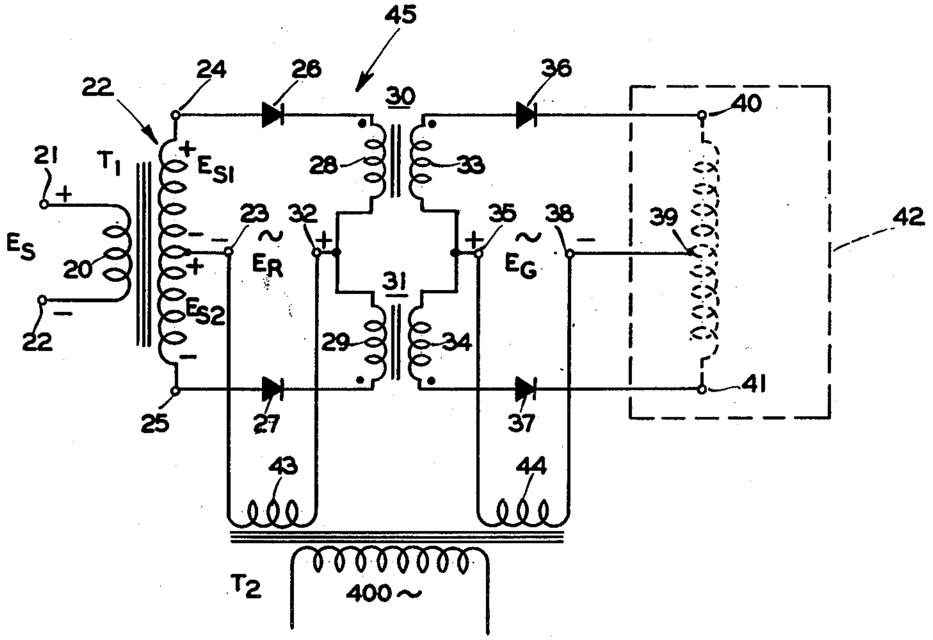
Fig. 1 is a representative schematic diagram of the magnetic amplifier demodulator.

Referring to the drawings, there is shown a coupling transformer T1 having a primary 20 coupled to terminals 21 and 22, which are the input terminals for the signal voltage indicated on the drawings as $E_s$. The secondary of the coupling transformer has a secondary 22 with a two-part winding $E_{s1}$ and $E_{s2}$, and a mid-tap terminal 23. Terminals 24 and 25 of the secondary 22 are coupled to rectifiers 26 and 27, which are in turn coupled to the reset windings 29 and 28 of the saturable reactor elements 30 and 31. The reset windings are connected in series opposition and have a common terminal 32.

The gate windings 33 and 34 are connected in series opposition, as shown by the conventional dot system, and have a common connection to terminal 35 with the outer ends thereof connected to rectifiers 36 and 37. A terminal 38 is in common with terminal 39. Terminals 40 and 41 are connected to the cathodes of rectifiers 36 and 37 respectively, so that the output of the demodulator is provided at terminals 39, 40 and 41; so that the differential output currents may be used to couple, through a transfer device, to any one of a variety of actuators. A representative transfer device 42 is indicated in block form, and may be equivalent to block 47 of Fig. 2, and, for example, may be a transfer device such as a differential relay having one winding connected between terminals 39 and 40, with another winding connected between terminals 39 and 41, so that the differential voltage may be used to actuate, for example, the armature of a relay in either one direction or the other, in a well known manner.

The power transformer T2 has secondaries 43 and 44. Secondary 43 supplies excitation of fixed frequency and amplitude to the terminals 23 and 32 to supply a fixed reference $E_R$ between the mid-taps of the secondary of the coupling transformer T1 and the terminal 32 of the reset windings. The secondary 44 supplies the gating voltage $E_G$ to the terminals 35 and 39 via terminal 38.

By means of the conventional dot system, both the reset windings and the gate windings of the saturable reactor elements 30 and 31 indicate that the windings as presented in Fig. 1 are shown to be connected in series opposition. The polarities as shown by conventional plus and minus symbols are for a given instance, when the signal voltage $E_s$ has the polarities as shown in the drawings.

The high speed saturable reactor elements 30 and 31 are connected with relative polarities of the windings and voltages as shown in Fig. 1. With a "no signal" condition, the reset voltage $E_R$ resets both saturable reactor elements 30 and 31 equally during one half cycle, causing equal currents to be conducted through rectifiers 36 and 37 on the following half cycle, thereby resulting in no differential direct current voltage through the windings shown dotted in the transfer device, it being assumed that the reset voltage $E_R$ and the gating voltage $E_G$ are of the same frequency and of opposite phase connected with the instantaneous polarities shown in Fig. 1.

When a signal is impressed across terminals 21 and 22, the voltages appearing across rectifiers 26 and 27 will be different from each other, thereby causing different amounts of reset of cores in the saturable reactors 30 and 31. This differential amount of reset causes corresponding unequal conduction through rectifiers 36 and 37, which is proportional to the magnitude of the signal. The polarity of this differential direct current output voltage is determined by the relative phase of the signal with respect to the reference voltage $E_R$.

The signal voltage $E_S$ impressed across terminals 21 and 22, may come from any suitable source, such as a vacuum tube, a transistor, or a magnetic amplifier, or the signal voltage may come directly from a synchro or any other sensor which produces a carrier frequency signal.

When there is no signal, the outputs are equal or balanced. When a signal is impressed across terminals 21 and 22, at one instant, the signal across winding $E_{S1}$ opposes the reset voltage $E_R$, and the output of that half of the demodulator increases across the load connected to terminals 39 and 40. At the same instant, the input signal $E_S$ impressed across the primary winding 20 of transformer T1, adds to the reset voltage $E_R$, and the output of that half of the demodulator decreases across the load connected to terminals 39 and 41. Consequently, it will be seen that under this condition there is a differential output voltage across terminals 40 and 41. If the phase of the input signal voltage $E_S$ is reversed from the condition set forth above, then the polarity of the output will be reversed.

The gating voltage and the reference voltage are shown as being taken from secondary windings of a 400 cycle frequency source of fixed amplitude for excitation of the reset windings and gate windings. The frequency of the reset and gating voltages may be of any suitable frequency which will operate in conjunction with a signal input having a carrier frequency of like periodicity. The saturable reactors have certain windings thereon which are coupled to the modulated signal source so that certain other of said windings, namely the gate windings, may be coupled to a suitable transfer device whose operative polarity is a function of the phase relation of the modulated signal source and the source of predetermined frequency for excitation of the windings connected to the terminals 22 and 32, and the terminals 35 and 38, of the reference voltage and gating voltage, respectively.

When there is no signal, $E_R$ provides power for the reset windings, and the gating voltage $E_G$ provides power for the gate windings. Under a "no signal" condition, the differential power output is zero.

At maximum signal, the power output differential is equal to the power provided by the gating voltage $E_G$ impressed across terminals 35 and 38.

Therefore, it will be seen that at a "no signal" condition, both sides of the demodulator are balanced, while at a "signal" condition, one side of the demodulator drives more than the other side depending on the phase and amplitude of the input signal.

Figure 2:
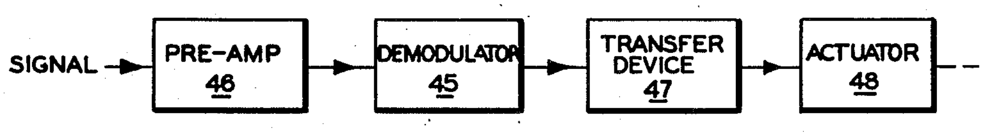
Fig. 2 is a block diagram of a servo amplifier showing the demodulator coupled between a signal source and an actuator.

Referring to Fig. 2, there is shown a servo amplifier in block form having the signal impressed, from any suitable source, upon the demodulator 45, with the signal being coupled through a pre-amplifier 46, where necessary. The output of the demodulator is shown coupled to a transfer device 47 of any suitable type, such as a differential relay as represented by the block 42 in Fig. 1, or any other suitable or conventional device, with the output of the transfer device coupled to an actuator 48.

The actuator may be a motor, a piston, a magnetic clutch, lever arrangement or other form of actuator. The actuators may include a phase sensitive magnetic power amplifier for driving a two-phase servo motor, a solenoid clutch-operated servo using a constant speed shaft as a source of energy, a solenoid transfer valve to control hydraulic flow to a power piston, a differential direct current relay, or a suitable reactor.

From the foregoing, it will be seen that the demodulator is negligibly affected by the presence of large amounts of "noise" in the input, which noise may be caused by quadrature, harmonics, or unwanted frequencies. The demodulator gives a power gain from input to output of the order of millivolts to watts. The stand-by power is low and it is almost equivalent to the maximum output power. Sensitivity of the demodulator is unaffected by voltage, frequency and temperature variations. The demodulator is of the high speed type and no warm-up time is required, and it is extremely versatile in its application.

The reference and gate voltages may be of any operative frequency, for example, as represented herein, as being of a frequency of 400 cycles. The signal voltage is accordingly represented as being of 400 cycles and is suitably modulated depending on the type of signal presented by the signal source device.

Under a "no signal" condition, the voltage appearing across the windings of the transfer device are balanced, and an actuator connected to said transfer would remain quiescent. Under a "signal" condition the voltages appearing across the respective windings of the transfer device would be unbalanced, thereby causing a differential voltage. This is so because the signal is always of one phase or the other. If the signal voltage, $E_S$, is in phase with the reset voltage, $E_R$, the signal $E_S$ adds to the amplitude of $E_R$ and appears across terminals 39 and 40, and simultaneously subtracts from the amplitude of $E_R$ which appears across terminals 39 and 41, thereby leaving a voltage differential appearing at the three terminal outputs connectable to the transfer device, said differential voltage being similar in waveform to the signal, and, obviously, of increased value.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A phase sensitive magnetic amplifier demodulator having a pair of saturable reactor elements each with a core of magnetizable material and a first winding and a second winding thereon, said first winding being connected in series opposition and having a common mid-point, said second winding being connected in series opposition and having a common mid-point, transfer means having end terminals and a common mid-point, rectifying means connected intermediate said second windings and said transfer means end terminals, a coupling transformer having a primary and a secondary with a mid-tap, rectifying means connected intermediate said secondary and said first windings, a source of alternating frequency voltage connected across said secondary mid-tap and the common mid-point of said first windings and also across the common mid-point of said second windings and the common mid-point of said transfer means, and a signal source connected to said coupling transformer primary to produce a unidirectional voltage output.

2. A phase sensitive magnetic amplifier demodulator having a pair of saturable reactor elements each with a core of magnetizable material and a first winding and a second winding thereon, said first winding being connected in series opposition and having a common mid-point, said second winding being connected in series opposition and having a common mid-point, transfer means having end terminals and a common mid-point, rectifying means connected intermediate said second windings and said transfer means end terminals, a coupling transformer having a primary and a secondary with a mid-tap, rectifying means connected intermediate said secondary and said first windings, a source of alternating frequency voltage connected across said secondary mid-tap and the common mid-point of said first windings and also across the common mid-point of said second windings and the common mid-point of said transfer means, and a signal source connected to said coupling transformer primary to produce a unidirectional voltage output, the output polarity being determined by the phase relation of the signal source to the alternating frequency voltage.

3. A phase sensitive magnetic amplifier demodulator having a pair of elements each with a core of magnetizable material and a first winding and second winding thereon, said first winding being connected in series opposition and having a common mid-point, said second winding being connected in series opposition and having a common mid-point, transfer means having end terminals and a common mid-point, rectifying means connected intermediate said second windings and said transfer means end terminals, a coupling transformer having a primary and a secondary with a mid-tap, rectifying means connected intermediate said secondary and said first windings, a reference voltage connected across said secondary mid-tap and the common mid-point of said first windings, and a gating voltage connected across the common mid-point of said second windings and the common mid-point of said transfer means, and input terminals for said coupling transformer primary to produce, whereby an input signal applied to said input terminals will produce an amplified output whose polarity is determined by the relative phase relation of the input to the reference voltage.

4. In a magnetic amplifier demodulator having saturable reactor elements with windings connected through rectifiers to the secondary of a coupling transformer and a differential transfer device, terminals for certain of said windings of said saturable reactor and said transfer device to have impressed thereacross a gating voltage, terminals for certain other windings of said saturable reactor elements and said secondary to have impressed thereacross a reset voltage, said gating and reset voltages being of a like predetermined frequency, and means for coupling an input signal to said secondary, whereby when said reset and gating voltages are impressed across their respective terminals, a modulated carrier input signal of a frequency the same as said predetermined frequency will impress a unidirectional output voltage on said transfer device of a polarity dependent upon the phase relation of the carrier input signal to said reset voltage.

5. In a magnetic amplifier demodulator having saturable reactor elements with reset and gate windings thereon and with said gate windings being connected through rectifier elements to a differential transfer device for coupling to a source of voltage of pre-determined frequency, a coupling transformer having preliminary and secondary windings, and rectifier elements coupling the secondary windings to the reset windings for energizing the latter when connected to a source of reference voltage of the same frequency as said predetermined frequency, said primary winding being the means for receiving a carrier input signal whose frequency corresponds to said predetermined frequency for providing a unidirectional output signal for said transfer device upon energization of said reset and gate windings by said predetermined frequency when a signal is impressed upon said primary winding.

6. In a magnetic amplifier demodulator having saturable reactor elements with reset and gate windings thereon and with said gate windings being connected through rectifier elements to a differential transfer device and a source of voltage of predetermined frequency, a coupling transformer having primary and secondary windings, rectifier means coupling said secondary winding to said reset windings and the source of predetermined frequency, and a source of modulated input voltage impressed upon said primary to produce a unidirectional signal for said transfer device, the polarity of said unidirectional signal being dependent upon the phase relation of said modulated input voltage and said predetermined frequency.

7. In a magnetic amplifier demodulator having saturable reactor elements with reset and gate windings thereon and with said gate windings being connected through rectifier elements to a differential transfer device and a source of voltage of predetermined frequency, coupling means having windings thereon, rectifier means coupling certain of said coupling means windings to the reset windings and said source of predetermined frequency, a modulated signal source, certain other of said windings of said coupling means being connected to said modulated signal source for providing a unidirectional voltage for said transfer device whose operative polarity is a function of the phase relation of said modulated signal source and source of predetermined frequency.

8. In a magnetic amplifier demodulator having elements with cores of magnetizable material with reset and gate windings thereon and with said gate windings being connected through rectifier elements to a differential transfer device connectable to a source of voltage of predetermined frequency, a coupling means having windings and rectifier means coupling certain of said coupling means windings to said reset windings for energizing the latter when connected to a source of voltage of the same frequency as said predetermined frequency, certain other of said coupling means windings having signal input terminals, whereby when a source of said voltage of predetermined frequency is connected to said magnetic amplifier device, an amplified unidirectional voltage will be impressed upon said transfer device when said input terminals are connected to a suitable signal source.

References Cited in the file of this patent

UNITED STATES PATENTS

| | | |
|---|---|---|
| 2,637,018 | Den Hertog | Apr. 28, 1953 |
| 2,698,392 | Herman | Dec. 28, 1954 |